United States Patent [19]

Gulczynski

[11] Patent Number: 4,803,610

[45] Date of Patent: Feb. 7, 1989

[54] SWITCHING POWER SUPPLY

[76] Inventor: Zdzislaw Gulczynski, P.O. Box 441, Winchester, Mass. 01890

[21] Appl. No.: 35,479

[22] Filed: Apr. 7, 1987

[30] Foreign Application Priority Data

Apr. 7, 1986 [DE] Fed. Rep. of Germany ....... 3611556

[51] Int. Cl.$^4$ ............................................ H02M 3/335
[52] U.S. Cl. ........................................ 363/70; 363/45; 363/60
[58] Field of Search ...................... 363/39, 44, 45, 46, 363/47, 48, 60, 61, 69, 70, 65, 68; 333/181, 182; 323/222, 267

[56] References Cited

U.S. PATENT DOCUMENTS 3,745,443  7/1973  Weil .................................... 323/267
4,245,286  1/1981  Paulkovich ......................... 363/101

FOREIGN PATENT DOCUMENTS 0013971  1/1982  Japan ..................................... 363/61
2094076  9/1982  United Kingdom .................. 363/60

OTHER PUBLICATIONS

Wood, Peter, Switching Power Converters, 1981 pp. 47 and 237.

Primary Examiner—Patrick R. Salce
Assistant Examiner—Judson M. Jones

[57] ABSTRACT

The invention relates to switching power supplies receiving DC input voltage, particularly for highly efficient regulators operating at high switching frequency and high power audio amplifiers. A switching power supply generally provides a pair of switching power supplies operating alternatively to supply energy to and from an output. Also provided are simplified designs of the combination of the two switching power supply circuits and the use of the present invention in a power amplifier. A switching power supply provides a pair of switching converters each having an input and output terminals, and a reference terminal being coupled to ground, the input terminal of each switching converter being coupled to the output terminal of the remaining switching converters, and a capacitor being coupled to ground, one of the converters having the input terminal coupled to receive the input signal and the output terminal coupled to the capacitor with the output signal of the switching power supply appearing thereacross.

20 Claims, 7 Drawing Sheets

SWITCHING POWER SUPPLY

This application is related to the applications entitled "Power Amplifier" Ser. No. 027,561 filed on 03/18/87, "Switching Power Supply" Ser No. 936,293 filed on 12/02/86, now U.S. Pat. No. 4,736,286 issued on 04/05/1988 and "Push-Pull Power Amplifier" Ser. No. 330,020 filed on 12/14/81, now U.S. Pat. No. 4,476,441 issued on 10/09/84. All inventions are by the same inventor.

BACKGROUND OF THE INVENTION

The invention generally relates to switching power supplies receiving DC input voltage, particularly for highly efficient regulators operating at high switching frequency and high power audio amplifiers.

Switching power supplies are generally electrical energy regulators which change electrical signals from one form to another by the use of high speed switching components.

The disadvantages of conventional switching power supplies are many. They typically include a very complex structure in spite of the use of integrated circuits. The primary current of a power transformer is, by principle, periodically interrupted resulting in high voltage spikes and large EMI/RFI distortions. Numerous interference suppressors and protection circuits are inevitable.

SUMMARY OF THE INVENTION

Accordingly, the present invention is intended to provide a switching power supply having a very low number of components, short response time, very high reliability and efficiency as well as an extremely low EMI/RFI level.

A power supply according to the present invention includes a pair of switching converter means each having an input and output terminals, and a reference terminal being coupled to ground, the input terminal of each switching converter means being coupled to the output terminal of the remaining switching converter means, and a capacitor being coupled to ground, one of the converter means having the input terminal coupled to receive the input signal and the output terminal coupled to the capacitor with the output signal of the switching power supply appearing thereacross.

In another embodiment power supply includes first and second voltage sources, and a node, first and second switches being coupled respectively between the first and second voltage sources and the node, a diode bridging the first switch to limit any voltage on the node to approximately the voltage of the first voltage source, a third switch and an inductor each being coupled to the node and also being separately coupled to ground and an output terminal in either order, and a capacitor being coupled between the output terminal and ground with an output signal of the switching power supply appearing thereacross.

A digital power amplifier according to the present invention includes a comparator means for comparing the input and output signals and providing a comparison signal according thereto, a time constant network for delaying a signal applied thereto and providing the output signal, and a generator means responsive to the comparison signal for providing and selectively applying a substantially square wave voltage to the time constant network for providing a correction of the output signal of the digital power amplifier.

The present embodiments do not require minimization of the time that both of the switches are off. This helps to avoid overlapping of the conduction phases of multiple switches. Consequently, there are no requirements on the symmetry of a control circuitry. No overvoltage spikes and no surge currents are expected; the reliability is very high. No minimum load is required. Finally, thyristors and triacs can be employed.

BRIEF DESCRIPTION OF THE DRAWINGS

The present invention will become more clear in conjunction with the accompanying figures of which.

Throughout the drawings, similar references denote similar parts.

DETAILED DESCRIPTION OF THE INVENTION

For the purpose of the present application the term converter refers to a device having three terminals, consisting of three components, and being employed for the conversion of a predetermined DC input voltage into the required DC output voltage. Assuming a positive input voltage, the three components are connected to input, reference and output terminals in the following order, respectively:

an inductor, a switch and the cathode of a diode in case of boost converter, a switch, the anode of a diode and an inductor in case of buck converter, a switch, an inductor and the anode of a diode in case of flyback converter.

Figure 1:
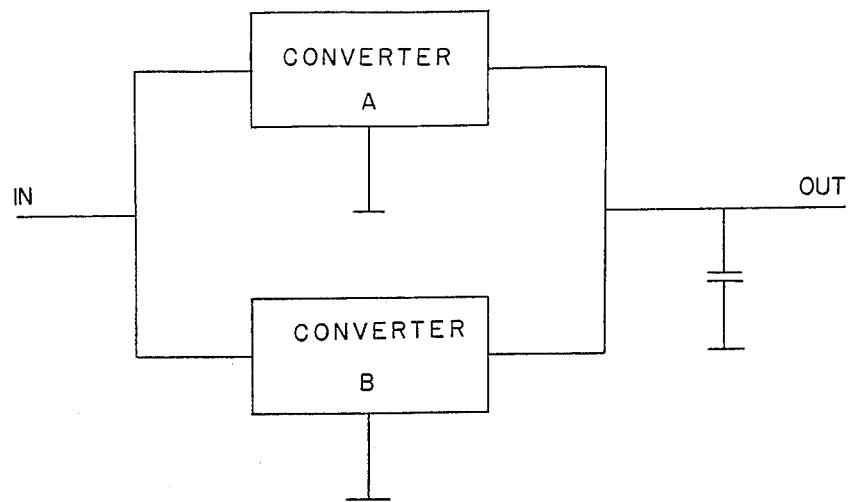
FIG. 1 is a first embodiment of the invention.

The switching power supply in FIG. 1 employs two converters; A and B. Three combinations are of interest: two flyback converters as shown in FIG. 1c or, in either order, one boost and one buck converter can be employed The input and output of converters A and B respectively are coupled to the input voltage source. The input and output of converters B and A respectively are coupled to a capacitor and the output of the power supply. The reference terminals of the converters A and B, and the capacitor are coupled to ground. A higher output power can be achieved through a parallel connection of additional converters to converters A and/or B and of a like type, thus having input, reference and output terminals respectively coupled together. As an example, FIG. 1b shows an embodiment with buck converter A, boost converter B and additional boost converter.

Figure 1A:
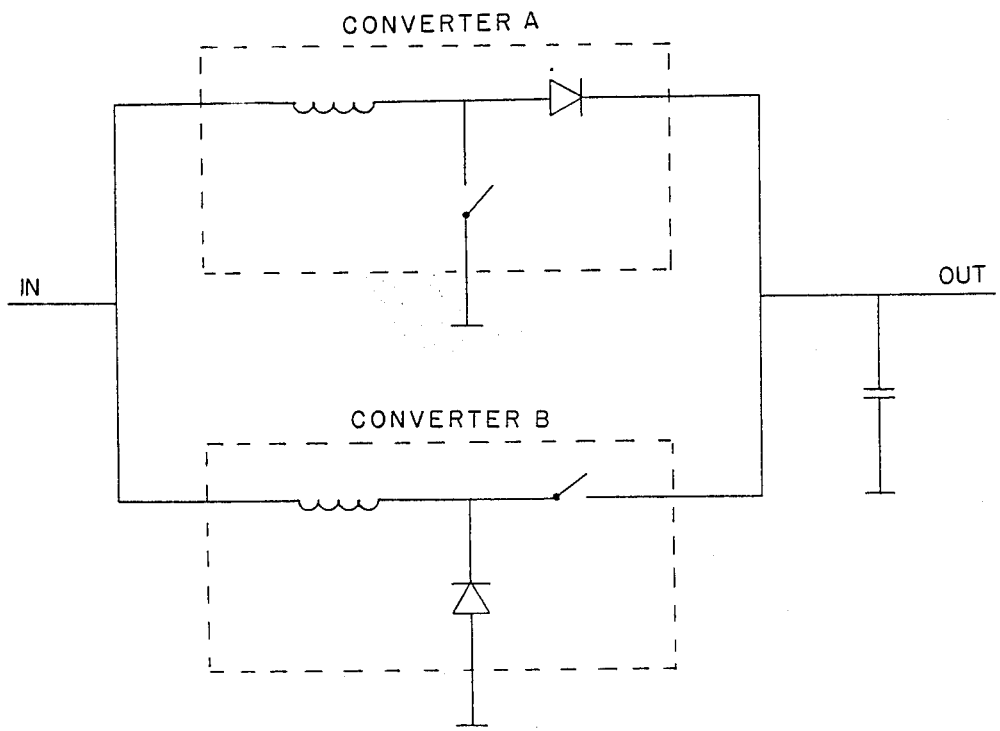
FIG. 1a is an embodiment with boost converter A and Buck converter B.
Figure 1B:
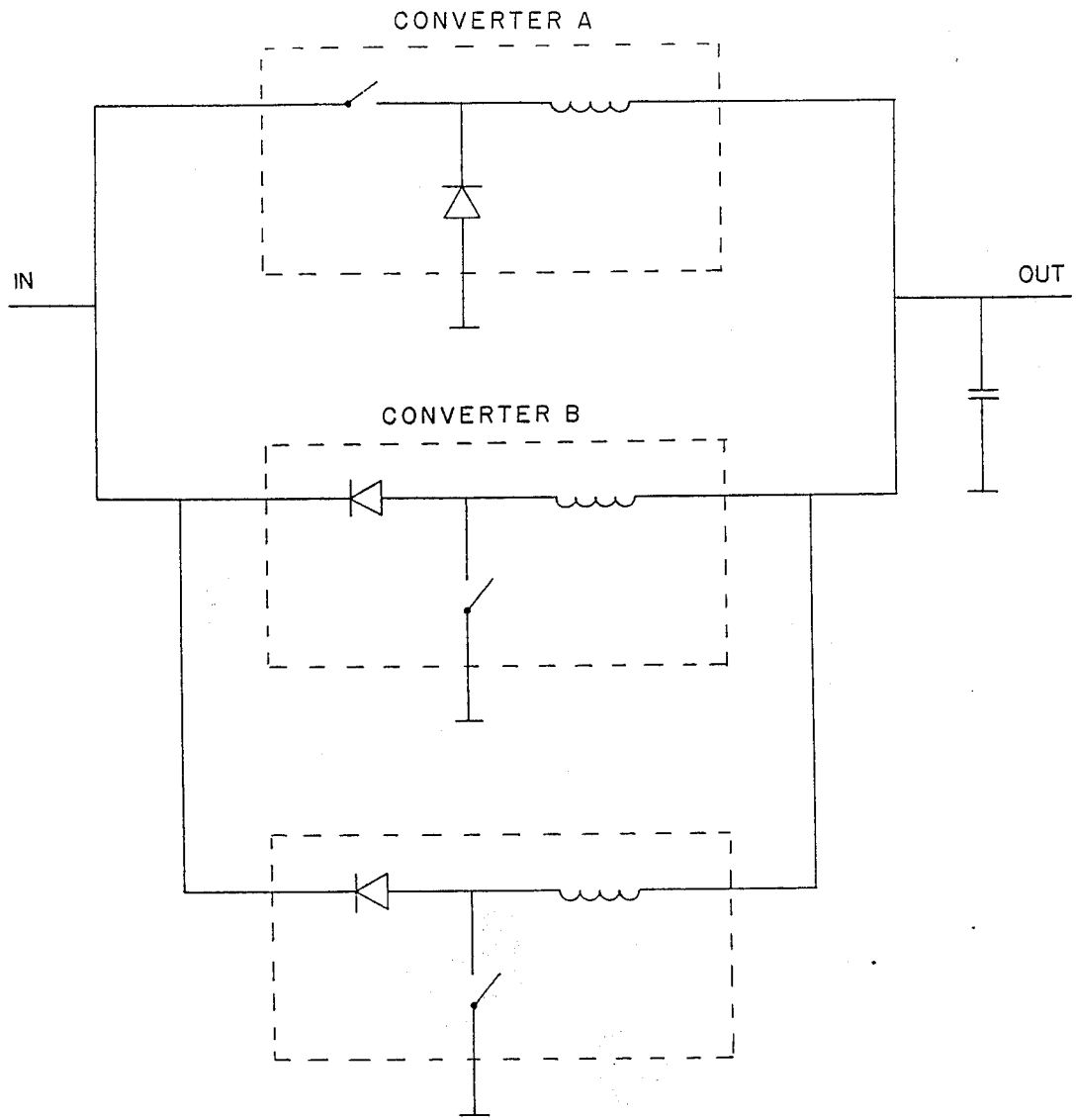
FIG. 1b is an embodiment with buck converter A, boost converter B and additional boost converter cupled in parallel with converter B.
Figure 1C:
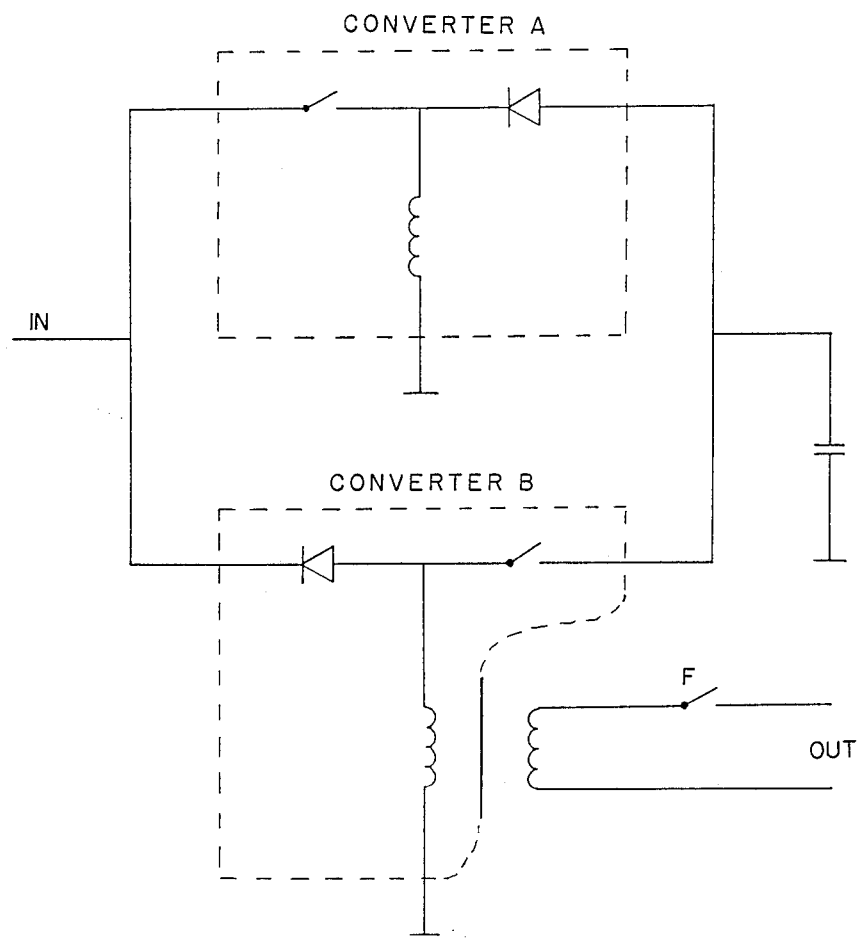
FIG. 1c is an embodiment with flyback converters A and B.

The mode of operation is to be explained on the example of the switching power supply with boost converter A and buck converter B as shown in FIG. 1a. The version is especially advantageous due to its uninterrupted input current.

The switch of the converter A is being switched on and off until the rising output voltage has reached a required value; the peak current of the switch can be also considered. The output voltage can be too high however; the capacitor has been charged too much or the load connected to the output, which for instance has an inductive portion, returns back the received energy. The converter B provides that the output voltage is reduced to a required value, whereby the energy surplus is delivered back to the input voltage source.

Figure 2:
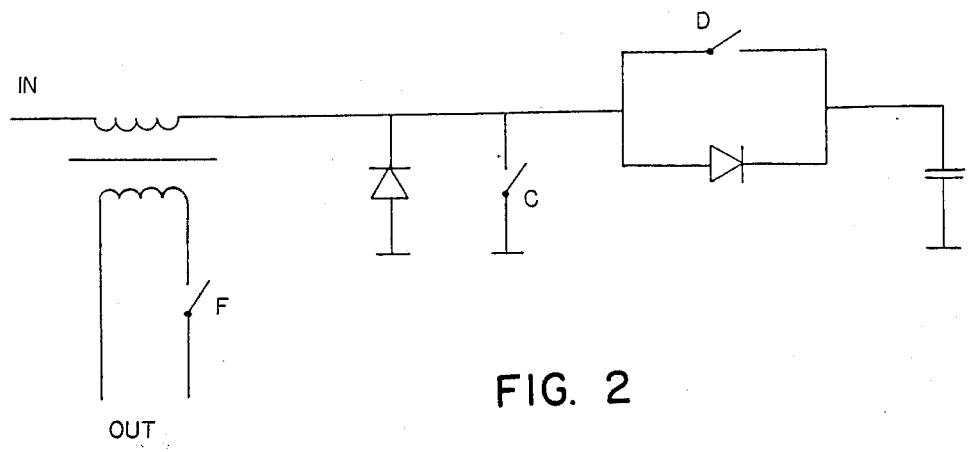
FIG. 2 is a version with one boost and one buck converters.

As will be shown in FIG. 2, the result of FIG. 1 can be achieved through a connection of the common nodes of the components of both converters. Three combinations are possible: two flyback or, in either order, one boost and one buck converters can be employed. Only one inductor is necessary in each case as a result of a parallel connection of two inductors.

FIG. 2 is an embodiment of the version with boost converter A and buck converter B, already described. Specifically, the switches of the converters A and B are marked as C and D respectively. The line isolation is achieved by adding another inductor magnetically coupled to the first inductor, i.e. by employing a transformer. The switch F is coupled in series with the secondary winding of the transformer and is closed when the magnitude and polarity of the voltage across the winding allows a correction of output voltage on the load. Thus, the transformer voltage is selectively applied to the load. A triac, if employed as the switch F, must be only triggered. It is automatically turned off following a switching of the transformer's primary voltage.

A reduction of the current slew rate can be accomplished, as usual, by a serial connection of an inductor with the primary and/or secondary winding of the transformer. As mentioned, the above circuits are operable with flyback converters. A version of FIG. 2 with two flyback converters is the result when the switch C and the diode coupled in parallel thereto are exchanged with the inductor or transformer.

Figure 3:
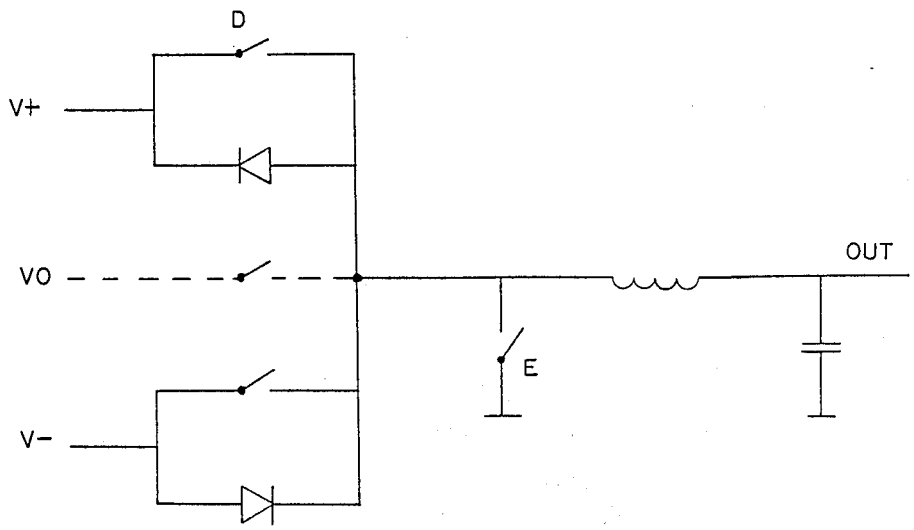
FIG. 3 is a version with two buck and two boost converters.

FIG. 3 is an embodiment with four converters. The circuit was formed by a parallel connection of two power supplies of FIG. 1 each having buck converter A and boost converter B, wherein the common nodes of the components of all four converters are coupled together and the reference terminals thereof are coupled to ground. One of the diodes is unnecessary if the voltage sources V+ and V− have alike polarity. The switch E is employed in place of the pair of diodes and the pair of switches normally coupled to ground.

The switch D is switched when the capacitor voltage must be increased. However, if the voltage is too high, the switch E is switched, whereby the capacitor is then the energy source. The switch E can be also closed immediately after opening the switch D and thus operate as a diode. An ideal transfer of the inductor current can be accomplished through an employment of a triac as switch E by providing a gate voltage of an opposite polarity. However, the switch E can be constantly open when the output voltage is switched in a range of zero crossing.

Similarly, the output voltage can be decreased down to the negative voltage of the voltage source V− through switching the switch coupled thereto.

An excessive switching frequency can be prevented by coupling one or more additional voltage sources, such as VO, each via a switch, to the common node of the components of the converters, in this case also to the switch E. In another example, an output of an ordinary power supply of a low power and having a line transformer can be coupled via a switch parallel to the inductor. A small voltage can be then applied to the inductor, independently of the output signal.

Figure 3A:
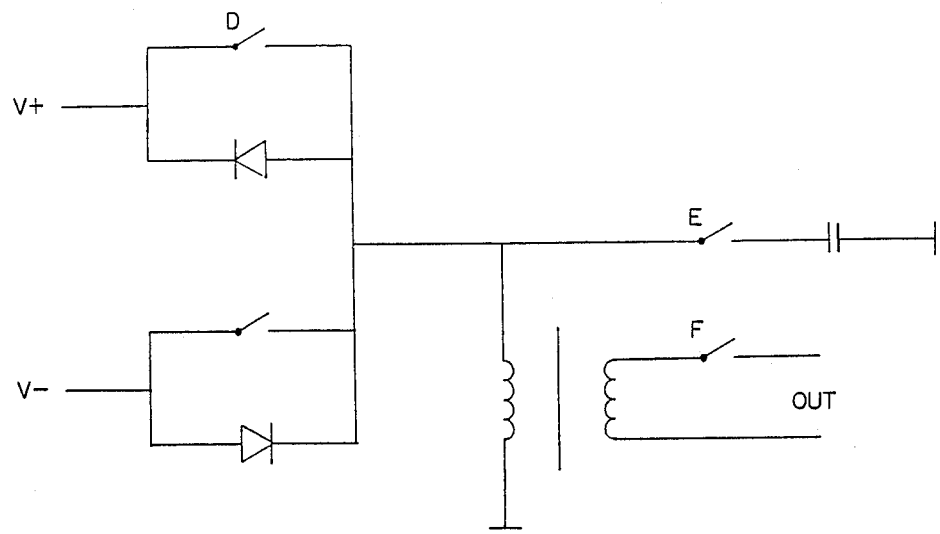
FIG. 3a is an embodiment with four flyback converters.

As shown in FIG. 3a, the above circuits are operable with flyback converters. A version of FIG. 3 with four flyback converters is the result when the inductor and the switch E are exchanged. The line isolation can be achieved by adding another inductor magnetically coupled to the first inductor, i.e. by employing a transformer, similarly to the embodiment of FIG. 2. The switch F can be also coupled in series with the secondary winding of the transformer for selectively applying the secondary output signal thereof.

The switching power supply is extremely well suitable for the systems requiring a controllable supply voltage, especially audio amplifiers of a high output power. The power supply is actually also an operative power amplifier.

Figure 4:
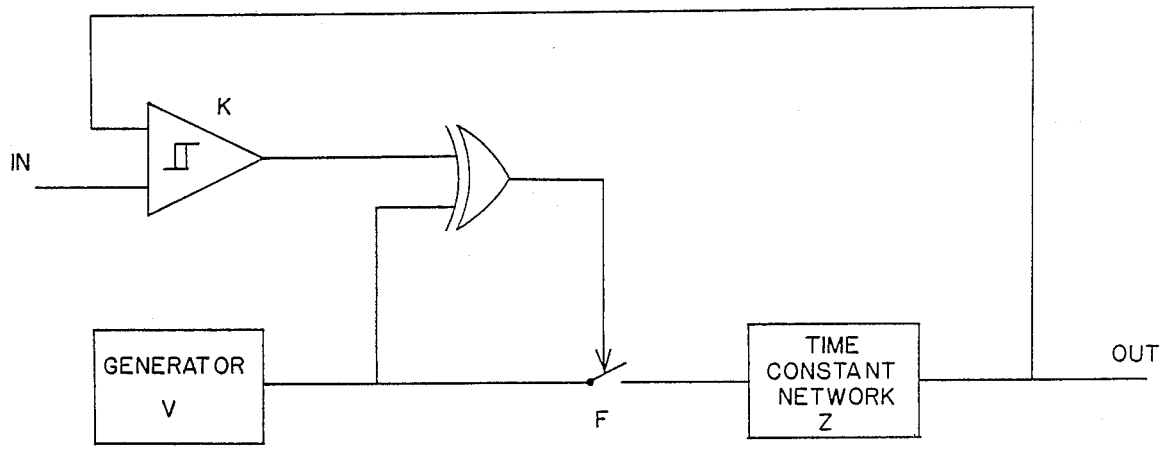
FIG. 4 is a digital power amplifier.

FIG. 4 is an embodiment of a digital power amplifier. The power supply is symbolically shown as a square wave voltage generator V. The load, in this case a loudspeaker with an LC time constant network Z connected prior thereto can be coupled directly to the output of the power supply. It shall be pointed out that the time constant network Z replaces an output low-pass filter employed in ordinary digital power amplifiers.

The comparator K compares the output voltage with the audio input signal, whereby the result determines the direction of the output current. The XOR gate coupled to the comparator K turns the switch F on if the magnitude of the voltage of the generator V allows such a current direction. By this means the correction of output voltage is achieved.

A power supply, e.g. as embodied in FIG. 2, having a transformer with a secondary winding providing an output voltage can be employed as the voltage generator V.

Figure 4A:
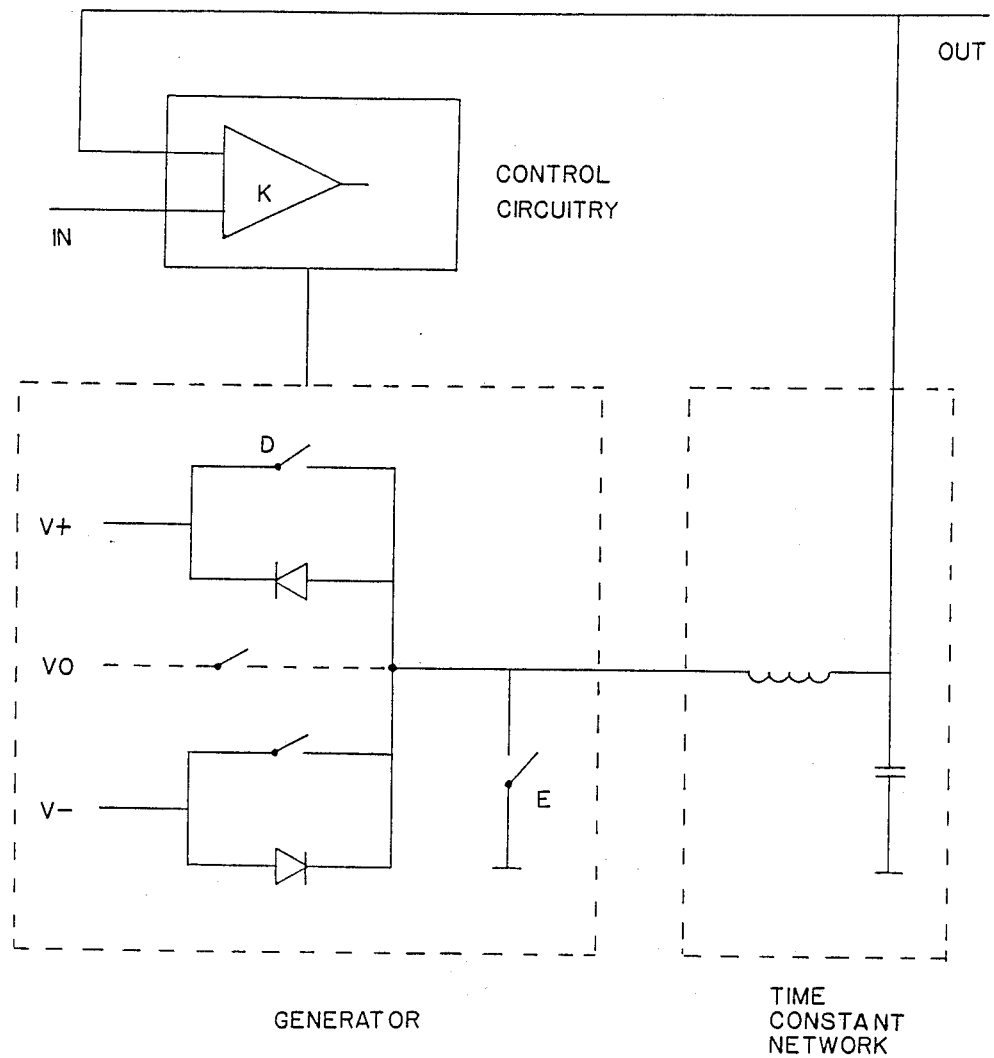
FIG. 4a is a power amplifier with two buck and two boost converters.
Figure 4B:
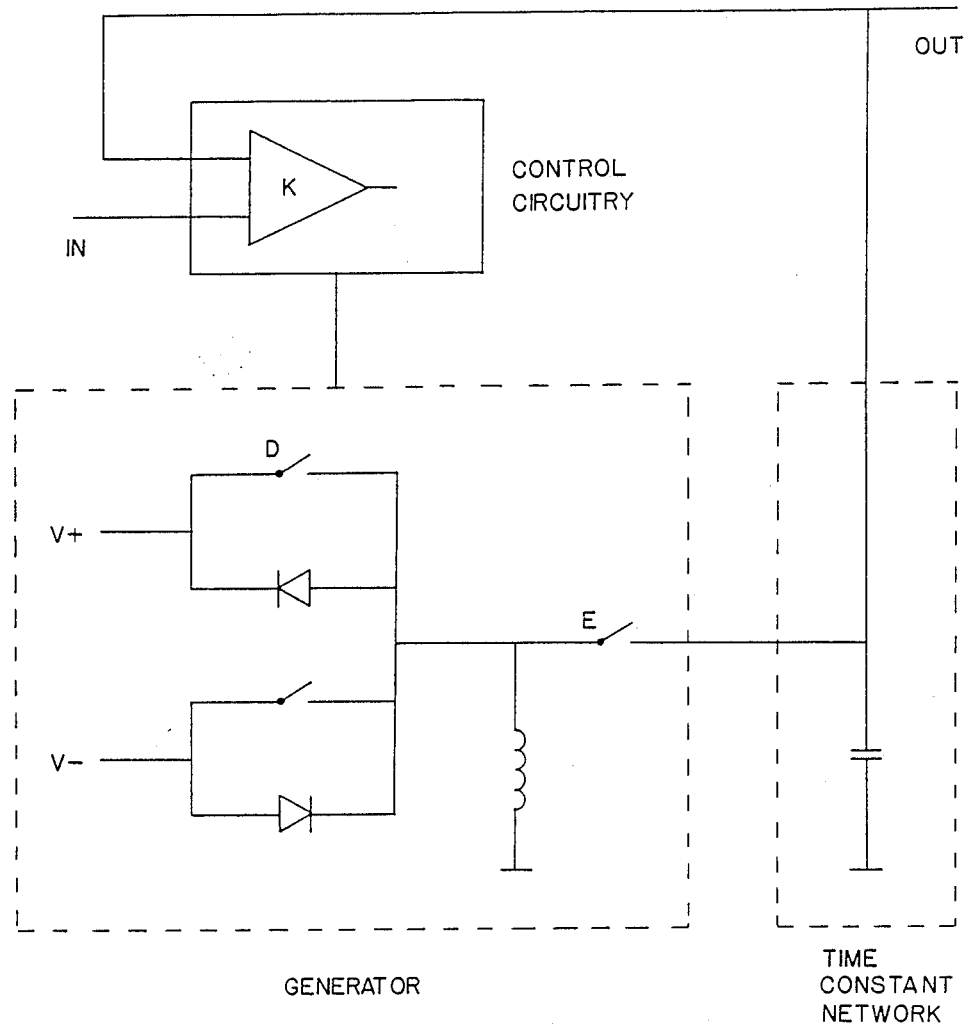
FIG. 4b is a power amplifier with four flyback converters.

The circuit can be further simplified through an employment of the power supply of FIG. 3 or its various modifications. The three or more switches comprised therein take over the operation of the switch F which thus becomes obsolete. The inductor and output capacitor of the power supply can be included as a part of the time constant network Z. Similarly, the circuit is operable with flyback converters. A version of FIG. 3 with four flyback converters is the result when the inductor and the switch E are exchanged as shown in FIG. 4b.

The hysteresis of the comparator K determines the amplitude of the corrective noise signal superimposed onto the output signal, which noise signal is the square wave voltage of the generator V smoothed out by the time constant network Z. It is very beneficial to determine the points of time at which the output voltage of the generator V is switched, according to the frequency of the audio input signal and the amount of the output current so that the noise signal can be very small.

The input signal can be initially delayed as to allow a control circuit to forecast the oncoming occurrences so that the generator V can immediately react to the energy demand determined by a differential signal. It is also very advantageous to increase the hysteresis of the comparator K for a higher amplitude of the input signal so that the distortion and noise levels remain very small.

In conclusion, the switching power supplies distinguish a very low number of components, short response time, very high reliability and efficiency as well as an extremely low EMI/RFI level. Overvoltage spikes and surge currents are eliminated; no snubbers are required. The output ripple is very low, no minimum load is required. The power supplies contain at least two switches being switched alternatively. The output capacitor is charged when the output voltage is insufficient and becomes an energy source when the voltage is too high. A line isolation can be easily accomplished by employing a transformer in place of an inductor as shown in FIGS. 1c, 2 and 3a. The power supplies actually become also operative audio power amplifiers by adding a control circuitry as shown in FIGS. 4, 4a and 4b. An especially simple version results by including a time constant network coupled prior to the loudspeaker as a part of a power supply. Only a single comparator provides for an input signal quantization.

The embodiments of the present invention described herein are intended to be taken in an illustrative and not a limiting sense. Various modifications and changes may be made to these embodiments by persons skilled in the art without departing from the scope of the present invention as defined in the appended claims.

What I claim is:

1. Switching power supply, for converting an input signal into an output signal, comprising:
   a pair of switching converter means each having an input and output terminals, and a reference terminal being coupled to ground;
   the input terminal of each switching converter means being coupled to the output terminal of the remaining switching converter means; and
   a capacitor being coupled to ground;
   one of the converter means having the input terminal coupled to receive the input signal and the output terminal coupled to the capacitor with the output signal of the switching power supply appearing thereacross.

2. Switching power supply of claim 1, wherein each of switching converter means includes an inductor, a switch and a diode with each being connected to a common node thereof.

3. Switching power supply of claim 2, wherein one switching converter means is a boost converter with the inductor, switch and diode each also being connected respectively to the input, reference and output terminals thereof, and the other switching converter means is a buck converter with the switch, diode and inductor also being connected respectively to the input, reference and output terminals thereof.

4. Switching power supply of claim 2, wherein each switching converter means is a flyback converter with the switch, inductor and diode each also being connected respectively to the input, reference and output terminals thereof.

5. Switching power supply of claim 2, wherein the common nodes of both switching converter means are tied together.

6. Switching power supply of claim 2, further comprising a third inductor magnetically coupled to at least one inductor of switching converter means for providing a second output signal of the power supply.

7. Switching power supply of claim 6, further comprising a fourth switch coupled in series with the third inductor for selectively applying the second output signal.

8. Switching power supply of claim 2, wherein the inductor, switch and diode of at least one of the switching converter means are separately coupled to the input, reference and output terminals of the switching converter means in accordance with a type thereof; and
   further comprising an additional switching converter means of the same type having input, reference and output terminals each coupled respectively to the input, reference and output terminals of the one of the switching converter means.

9. Switching power supply, comprising:
   first and second voltage sources, and a node;
   first and second switches being coupled respectively between the first and second voltage sources and the node;
   a diode bridging the first switch to limit any voltage on the node to approximately the voltage of the first voltage source;
   a third switch and an inductor each being coupled to the node and also being separately coupled to ground and an output terminal in either order; and
   a capacitor being coupled between the output terminal and ground with an output signal of the switching power supply appearing thereacross.

10. Switching power supply of claim 9, wherein the first and second voltage sources are of opposite polarity;
    further including a second diode coupled in parallel with the second switch, wherein opposite polarity terminals of the first and second diodes are coupled to the node.

11. Switching power supply of claim 9, further including at least one additional voltage source coupled to the node via a separate switch.

12. Switching power supply of claim 9, further comprising a second inductor magnetically coupled to the first said inductor for providing a second output signal of the power supply.

13. Switching power supply of claim 12, further comprising a fourth switch coupled in series with the second inductor for selectively applying the second output signal.

14. Digital power amplifier for amplifying an input signal and providing an output signal, comprising:
    a comparator means for comparing the input and output signals and providing a comparison signal according thereto;
    a time constant network for delaying a signal applied thereto and providing the output signal; and
    a generator means responsive to the comparison signal for providing and selectively applying a substantially square wave voltage to the time constant network for providing a correction of the output signal of the digital power amplifier.

15. Digital power amplifier of claim 14, wherein the generator means includes voltage means for providing a substantially square wave voltage, an exclusive logic gate for comparing the comparison signal with the square wave voltage and a switch means responsive to the exclusive logic gate for selectively applying the square wave voltage to the time constant network for providing a correction of the output signal of the digital power amplifier.

16. Digital power amplifier of claim 14, wherein the comparator means exhibits a hysteresis.

17. Digital power amplifier of claim 14, wherein the generator means includes first and second voltage sources, a node, first and second switches being coupled respectively between the first and second voltage sources and the node, a diode bridging the first switch to limit any voltage on the node to approximately the voltage of the first voltage source, and a third switch being coupled between the node and ground, and further wherein the time constant network includes an inductor and a capacitor coupled in series, wherein the inductor is coupled to the node and the capacitor is coupled to ground.

18. Digital power amplifier of claim 17, wherein the pair of voltage sources is of opposite polarity;

further including a second diode coupled in parallel with the other switch, wherein opposite polarity terminals of the first said and second diodes are coupled to the node.

19. Digital power amplifier of claim 17, further including at least one additional voltage source coupled to the node via a separate switch.

20. Digital power amplifier of claim 14, wherein the generator means includes at least a pair of voltage sources, a node, at least a pair of switches each being coupled separately between one of the voltage sources and the node, one or two diodes each bridging a separate one of the switches to limit any voltage on the node to approximately the voltage of the voltage source coupled to this diode, an additional switch being coupled between the node and the time constant network, and an inductor being coupled between the node and ground, and further wherein the time constant network includes a capacitor being coupled to ground.

* * * * *